(12) United States Patent
Kato (10) Patent No.: US 9,829,640 B2
(45) Date of Patent: *Nov. 28, 2017

(54) TEMPERATURE INSENSITIVE DEMUX/MUX IN SILICON PHOTONICS

(71) Applicant: INPHI CORPORATION, Santa Clara, CA (US)

(72) Inventor: Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/374,967

(22) Filed: Dec. 9, 2016

(65) Prior Publication Data

US 2017/0090122 A1    Mar. 30, 2017

Related U.S. Application Data

(63) Continuation of application No. 14/569,471, filed on Dec. 12, 2014, now Pat. No. 9,553,689.

(51) Int. Cl.
*H04J 14/02* (2006.01)
*H04B 10/12* (2006.01)
(Continued)

(52) U.S. Cl.
CPC .......... *G02B 6/29398* (2013.01); *G02B 6/00* (2013.01); *G02B 6/29344* (2013.01); *H04B 10/40* (2013.01); *H04J 14/02* (2013.01)

(58) Field of Classification Search
CPC  G02B 6/1203; G02B 6/12014; G02B 6/2931; H04B 10/676; H04J 14/06
(Continued)

(56) References Cited

U.S. PATENT DOCUMENTS 5,592,612 A    1/1997  Birk
5,689,597 A  * 11/1997  Besse ................... G02B 6/2813
                                                                         385/39
(Continued)

OTHER PUBLICATIONS

AdTran, Total Access 5000 One, Apr. 29, 2013, Total Access System, All Pages.*

(Continued)

*Primary Examiner* — David Payne
*Assistant Examiner* — Pranesh Barua
(74) *Attorney, Agent, or Firm* — Richard T. Ogawa; Ogawa P.C.

(57) ABSTRACT

A temperature insensitive DEMUX/MUX device whose wavelength does not change by environment temperature is provided for WDM application. The temperature insensitive DEMUX/MUX device includes a waveguide-based delay-line-interferometer configured to receive an input light bearing multiplexed wavelengths and output a first output light bearing the same multiplexed wavelengths but with a shifted intensity peak position. The first output light is transmitted into a DEMUX device through a first free space coupler and a grating fiber or waveguide to be demultiplexed for forming a plurality of second output lights each bearing an individual wavelength. The DEMUX device includes a second free space coupler for refocusing each second output light to corresponding output channel. The shifted intensity peak position of the first output light is tunable to make each second output light free from any temperature-induced drift off corresponding output channel.

18 Claims, 6 Drawing Sheets (51) Int. Cl.
*G02B 6/293* (2006.01)
*H04B 10/40* (2013.01)
*G02B 6/00* (2006.01)

(58) Field of Classification Search
USPC .................................. 398/79, 82, 141, 143
See application file for complete search history.

(56) References Cited

U.S. PATENT DOCUMENTS

| | | | |
|---|---|---|---|
| 6,128,094 A | 10/2000 | Smith | |
| 6,400,621 B2 | 6/2002 | Hidaka et al. | |
| 6,421,478 B1* | 7/2002 | Paiam | G02B 6/12014 385/24 |
| 6,542,956 B1 | 4/2003 | Lee et al. | |
| 6,571,038 B1* | 5/2003 | Joyner | G02B 6/2813 385/27 |
| 6,891,685 B2* | 5/2005 | Deliwala | G02F 1/025 257/E27.112 |
| 6,993,701 B2 | 1/2006 | Corbett et al. | |
| 7,394,953 B1* | 7/2008 | Nagarajan | G02B 6/12033 250/227.11 |
| 7,656,727 B2 | 2/2010 | Thayer | |
| 7,990,746 B2 | 8/2011 | Rajan | |
| 8,325,554 B2 | 12/2012 | Sweere et al. | |
| 8,687,451 B2 | 4/2014 | Wang | |
| 9,553,689 B2* | 1/2017 | Kato | H04J 14/02 |
| 2003/0128917 A1 | 7/2003 | Turpin | G02B 6/2861 385/24 |
| 2003/0215188 A1* | 11/2003 | Johannessen | G02B 6/12011 385/50 |
| 2004/0123029 A1 | 6/2004 | Dalal et al. | |
| 2005/0141812 A1* | 6/2005 | Paek | G11B 7/1353 385/37 |
| 2005/0169580 A1* | 8/2005 | Takahashi | G02B 6/12007 385/39 |
| 2006/0200697 A1 | 9/2006 | Ito | |
| 2008/0080806 A1* | 4/2008 | Ho | G02B 6/12014 385/14 |
| 2008/0089692 A1* | 4/2008 | Sorin | H04J 14/02 398/135 |
| 2008/0104290 A1 | 5/2008 | Cowell et al. | |
| 2008/0183959 A1 | 7/2008 | Pelley et al. | |
| 2009/0141558 A1 | 6/2009 | Sarin et al. | |
| 2009/0245795 A1* | 10/2009 | Joyner | H04B 10/505 398/79 |
| 2009/0263075 A1* | 10/2009 | Rhee | G02B 6/12016 385/14 |
| 2009/0300259 A1 | 12/2009 | Luo et al. | |
| 2010/0005212 A1 | 1/2010 | Gower et al. | |
| 2010/0119189 A1* | 5/2010 | Nasu | G02B 6/12007 385/1 |
| 2010/0162037 A1 | 6/2010 | Maule et al. | |
| 2010/0199125 A1 | 8/2010 | Reche | |
| 2010/0274952 A1 | 10/2010 | Lee | |
| 2010/0290735 A1* | 11/2010 | Joyner | G02B 6/12004 385/14 |
| 2010/0290790 A1* | 11/2010 | Murthy | H04B 10/66 398/192 |
| 2010/0322631 A1* | 12/2010 | Nagarajan | G02B 6/12004 398/65 |
| 2011/0072200 A1 | 3/2011 | Lee et al. | |
| 2011/0125990 A1 | 5/2011 | Khosravi et al. | |
| 2011/0170329 A1 | 7/2011 | Kang | |
| 2011/0243556 A1* | 10/2011 | Nagarajan | H04B 10/40 398/43 |
| 2012/0002918 A1* | 1/2012 | Kawashima | G02B 6/1203 385/24 |
| 2012/0063719 A1* | 3/2012 | Chomycz | H04J 14/0254 385/24 |
| 2012/0151294 A1 | 6/2012 | Yoo et al. | |
| 2012/0243299 A1 | 9/2012 | Shau | |
| 2012/0251046 A1* | 10/2012 | Kawashima | G02B 6/1221 385/37 |
| 2012/0251047 A1* | 10/2012 | Nara | G02B 6/12019 385/37 |
| 2012/0257459 A1 | 10/2012 | Berke | |
| 2012/0281234 A1* | 11/2012 | Matsui | G02B 6/29355 356/478 |
| 2012/0297231 A1 | 11/2012 | Qawami et al. | |
| 2013/0060996 A1 | 3/2013 | Berke | |
| 2013/0101249 A1* | 4/2013 | Doerr | G02B 6/12011 385/14 |
| 2013/0170782 A1* | 7/2013 | Evans | G02F 1/225 385/3 |
| 2013/0170833 A1* | 7/2013 | Nagarajan | H04J 14/02 398/48 |
| 2014/0029950 A1* | 1/2014 | Assefa | H04B 10/676 398/87 |
| 2014/0328584 A1* | 11/2014 | Sun | H04B 10/6165 398/25 |
| 2014/0348460 A1* | 11/2014 | Dorin | G02B 6/2766 385/3 |
| 2015/0049984 A1* | 2/2015 | Kato | G02F 1/225 385/31 |
| 2015/0085292 A1* | 3/2015 | Uesaka | G01J 9/0246 356/477 |
| 2016/0127044 A1* | 5/2016 | Ho | H04B 10/40 398/79 |

OTHER PUBLICATIONS

Office Action for U.S. Appl. No. 13/653,373, dated Mar. 27, 2014.
Notice of Allowance for U.S. Appl. No. 13/558,332, dated Feb. 25, 2014.
Office Action for U.S. Appl. No. 13/620,288, dated Oct. 1, 2013.
Office Action for U.S. Appl. No. 13/791,814, dated May 1, 2014.
Office Action for U.S. Appl. No. 13/619,692, dated May 14, 2014.
Office Action for U.S. Appl. No. 13/620,288, dated May 16, 2014.
Office Action for U.S. Appl. No. 13/791,807, dated May 29, 2014.
Office Action for U.S. Appl. No. 14/178,241, dated Jun. 27, 2014.

* cited by examiner

TEMPERATURE INSENSITIVE DEMUX/MUX IN SILICON PHOTONICS

CROSS-REFERENCE TO RELATED APPLICATIONS

The present specification is a continuation of U.S. patent application Ser. No. 14/569,471, filed on Dec. 12, 2014, the entire contents of which are incorporated herein by reference.

BACKGROUND OF THE INVENTION

The present invention relates to optical telecommunication techniques. More particularly, the present invention provides a silicon photonic device configuration of temperature insensitive DEMUX/MUX silicon and methods thereof.

Over the last few decades, the use of communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Progress in computer technology (and the continuation of Moore's Law) is becoming increasingly dependent on faster data transfer between and within microchips. Optical interconnects may provide a way forward, and silicon photonics may prove particularly useful, once integrated on the standard silicon chips. 40-Gbit/s and then 100-Gbit/s data rates wavelength-division multiplexing (WDM) optical transmission over existing single-mode fiber is a target for the next generation of fiber-optic communication networks. The big hangup so far has been the fiber impairments like chromatic dispersion that are slowing the communication signal down. Everything is okay up to 10 Gbits/s plus a little, but beyond that, distortion and attenuation take their toll. Many approaches are proposed on modulation methods for transmitting two or more bits per symbol so that higher communication rates can be achieved. Mach-Zehnder modulators (MZM) can handle the higher data rates but require a driver that is differential with a wide output voltage swing. Beyond the light modulation for data transmission, the MUX/DEMUX of light signals is an essential building block for the optical network based on silicon photonics.

Silicon photonic devices can be made using existing semiconductor fabrication techniques, and because silicon-on-insulator is already used as the substrate for most integrated circuits, it is possible to create hybrid devices in which the optical and electronic components are integrated onto a single microchip. In particular, silicon photonic devices have been applied in WDM, especially dense-wavelength-division multiplexing (DWDM), optical transmission networks, in which DEMUX/MUX wavelengths may be changed by environment temperature to cause problems to optical signals transmitted through the networks. Conventionally, wavelength control may be performed in the arrayed waveguide grating (AWG) DEMUX using a TEC circuit which is usually associated with high power consumption. Therefore, improved wavelength control techniques on temperature insensitive DEMUX/MUX devices with much reduced power consumption are desired.

BRIEF SUMMARY OF THE INVENTION

The present invention relates to optical telecommunication techniques. More particularly, the present invention provides a temperature insensitive DUMUX/MUX silicon photonic device for waveguide-based multiple channel optical transmission. Merely by examples, the present invention discloses a configuration of temperature insensitive DEMUX device as a solution for WDM optical communications with corresponding multi-channel wavelengths not being changed by environment temperature, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a temperature-insensitive DEMUX/MUX device for WDM applications, the device includes a delay-line interferometer (DLI) including a first MIMI coupler configured to receive a first input light bearing multiple wavelengths and split into two branches of light to respectively transmit through two waveguides with a phase delay. The DLI also includes a second MMI coupler configured to combine the two branches of light to form a first output light passing through an exit plane displaced a first distance further from a focus point of the two branches of light. Additionally, the device includes a first free-space coupler with an input plane attached with the exit plane of the second MMI coupler to receive the first output light as a second input light bearing the same multiple wavelengths. The device further includes one or more optical fibers or waveguides for grating the second input light spatially based on the multiple wavelengths. Furthermore, the device includes a second free space coupler configured to refocus the spatially grated light to form multiple second output lights respectively at multiple output channels each carrying an individual wavelength of the multiple wavelengths. Moreover, the first output light has an intensity peak position at the exit plane that is shifted away from a projected position of the focus point of the two branches of light by a second distance as environmental temperature is changed. The second distance is tunable to make each of the second output lights with corresponding individual wavelength being substantially free from any spatial shift off the corresponding output channel at any environmental temperature.

In an alternative embodiment, the present invention provides a method of making temperature-insensitive DEMUX channels for WDM applications. The method includes coupling a delay-line interferometer between a first input light bearing multiple wavelengths and an input port of a DEMUX device. The delay-line interferometer (DLI) includes a first MMI coupler configured to receive the first input light bearing multiple wavelengths and split to two branches of light. The DLI further includes two waveguides configured to respectively transmit the two branches of light with a phase delay in one of the two waveguides. Additionally, the DLI includes a second MMI coupler configured to combine the two branches of light to form a first output light bearing the same multiple wavelengths having an intensity peak position within an exit plane displaced a first distance away from a focus point of the two branches of light. The method further includes converting the first output light to a second input light into the DEMUX device and transmitting the second input light through a grating fiber or waveguide to form a multiple second output lights each bearing an individual wavelength of the multiple wavelengths. Furthermore, the method includes re-focusing each second output light to a corresponding output channel. Any spatial drift of each second output light away from the corresponding output channel due to a change of environmental temperature is compensated by shifting the first position of the first output light at the exit plane of the second MMI coupler.

In yet another alternative embodiment, the present invention provides a method of making temperature-insensitive DEMUX channels for WDM applications. The method includes adding a delay-length interferometer configured to receive a first light with multiplexed wavelengths and output a second light with the same multiplexed wavelengths but with a shifted intensity peak position. Additionally, the method includes transmitting the second light with a shifted intensity peak position as an input light through a DEMUX device to obtain multiple third lights each bearing an individual wavelength at each separate output channel. Furthermore, the method includes attaching a heater to the delay-line interferometer for tuning the shifted intensity peak position to compensate any temperature-induced drift of each third light away from each corresponding output channel.

The present invention achieves these benefits and others in the context of known waveguide laser communication technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to optical telecommunication techniques. More particularly, the present invention provides a temperature insensitive DUMUX/MUX silicon photonic device for waveguide-based multiple channel optical transmission. Merely by examples, the present invention discloses a configuration of temperature insensitive DEMUX device as a solution for WDM optical communications with corresponding multi-channel wavelengths not being changed by environment temperature, though other applications are possible.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM4, PAM8, PAM12, PAM16, etc.) in leaf-spine architecture that allows large amount (up terabytes of data at the spine level) of data to be transferred via optical network.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1A:
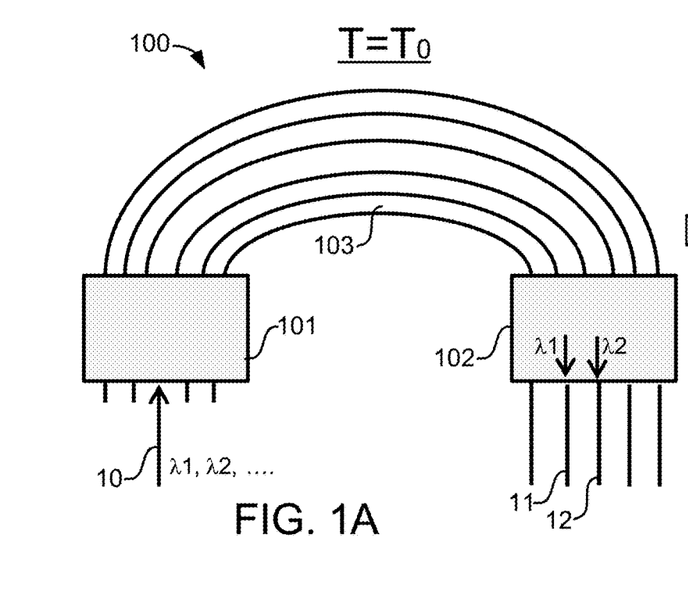
FIG. 1A is a simplified diagram of a conventional multi-channel DEMUX device at an environmental temperature $T_0$.

FIG. 1A is a simplified diagram of a conventional multi-channel DEMUX device at an environmental temperature $T_0$. As shown, the multi-channel DEMUX device 100 receives a light signal (10) mixed with multiple wavelengths (including two neighboring channels λ1 and λ2) corresponding to multiple WDM channels for optical communications. For example, these channels include a set of dense-wavelength-division multiplexing (DWDM) ITU grid wavelengths, which can be as transmitted in an optical fiber of long-distance in any DWDM optical communication systems. In another example, these channels can be multiple coarse-wavelength-division multiplexing (CWDM) channels. The two neighboring channels comprises a frequency spacing selected from 100 GHz, 50 GHz, 25 GHz, and 12.5 GHz for a DWDM system, although any other channel spacing is possible. The channel spacing can also be 20 nm (3500 GHz in 1300 nm wavelength window) for a CWCM system.

The multi-channel DEMUX device 100 is configured to split or decouple the light signal to multiple separate channels to retrieve each wavelength (e.g., λ1 or λ2) at the predetermined channel and output to an individual fiber or dedicated waveguide. The incoming light (10) traverses a free space coupler (101) and enters a bundle of optical fibers or arrayed waveguide gratings (AWG) based channels (103). The first free space coupler 101 can be a cavity where the input light diffracts from the specific location towards the bundle of optical fibers or arrayed waveguides (103). The fibers or waveguides (103) are made with different lengths and thus different phase shifts at the channel exits. A second free space coupler (102) is coupled to the channel exits and provides a cavity to allow the light interference from all channels. The process results in lights with different wavelengths demultiplexed, different wavelengths having maximal interference at different locations. Thus, the demultilexed lights are led to corresponding output ports the output waveguides in such a way that each output channel, e.g., channel 11 or channel 12, receives only light of one wavelength λ1 or λ2. The DEMUX device 100 is associated with light path from (101) to (102) while can be referred to a MUX device with a reversed light path.

Referring to FIG. 1A, the DEMUX device 100, regardless of being made from free-space fiber components or arrayed waveguide grating material, the light signal passing thereof is usually temperature dependent because environment temperature change can cause the refraction index change of the optical media. For example, the AWG-based DEMUX device is a planar lightwave circuit fabricated by depositing doped and undoped layers of silica on a silicon substrate including a number of grating waveguides (103) with a constant length increment (ΔL) from one channel to next channel, providing an array phase shift. Light diffracting out of the input waveguide at the coupler/slab interface propagates through the free-space region (101) and illuminates the grating with a Gaussian distribution. Each wavelength of light coupled to the grating waveguides (103) undergoes a constant change of phase attributed to the constant length increment in grating waveguides. Light diffracted from each waveguide of the grating interferes constructively through another free-space region (102) and gets refocused at the output channels with corresponding spatial positions being dependent on the array phase shift which is temperature dependent. For example, the multi-channel DEMUX device 100 is configured, at environment temperature $T=T_0$, to have each de-multiplexed light with a distinct channel wavelength perfectly aligned to one predetermined output channel position so that the corresponding light signal with that specific wavelength can be transmitted into the corresponding waveguide.

Figure 1B:
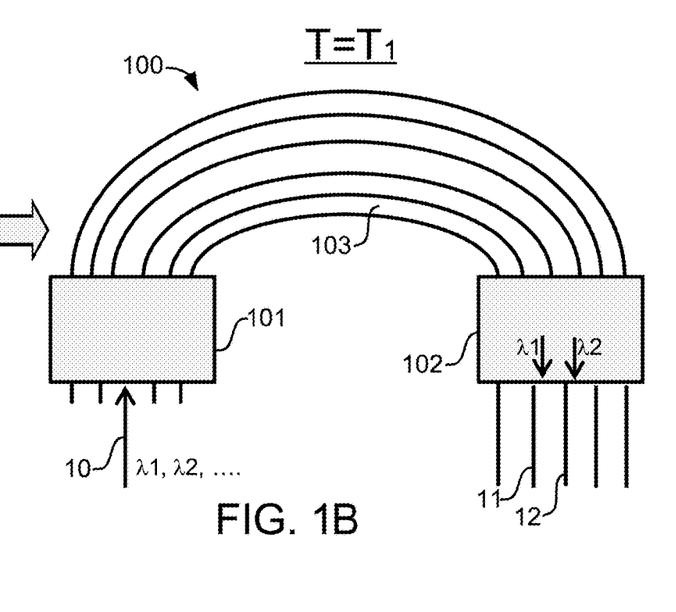
FIG. 1B is a simplified diagram of the multi-channel DEMUX device of FIG. 1A at another environmental temperature $T_1 \neq T_0$.

FIG. 1B is a simplified diagram of the multi-channel DEMUX device of FIG. 1A at another environmental temperature $T_1 \neq T_0$. As shown, when the environment temperature is changed from $T_0$ to $T_1$, so does the array phase shift within the grating waveguides (103), resulting in spatial changes of focal positions at the output waveguides. For example, channel 11 with wavelength λ1 or channel 12 with wavelength λ2 (and each of all other channels) is shifted away from corresponding designated light-focused positions so that the output waveguides cannot properly transmit the individual light signals with corresponding de-multiplexed wavelengths. Conventional solution for this issue is to add a temperature stabilizer to the DEMUX device 100. For example, typical AWG-based DEMUX device includes a TEC device that can either heat or cool the grating waveguides (103) to maintain the temperature at the designated $T_0$ value (with small allowable margin) as the environmental temperature changes. This, of course, introduces big power consumption for such DEMUX device deployed in field for optical communications.

Figure 2:
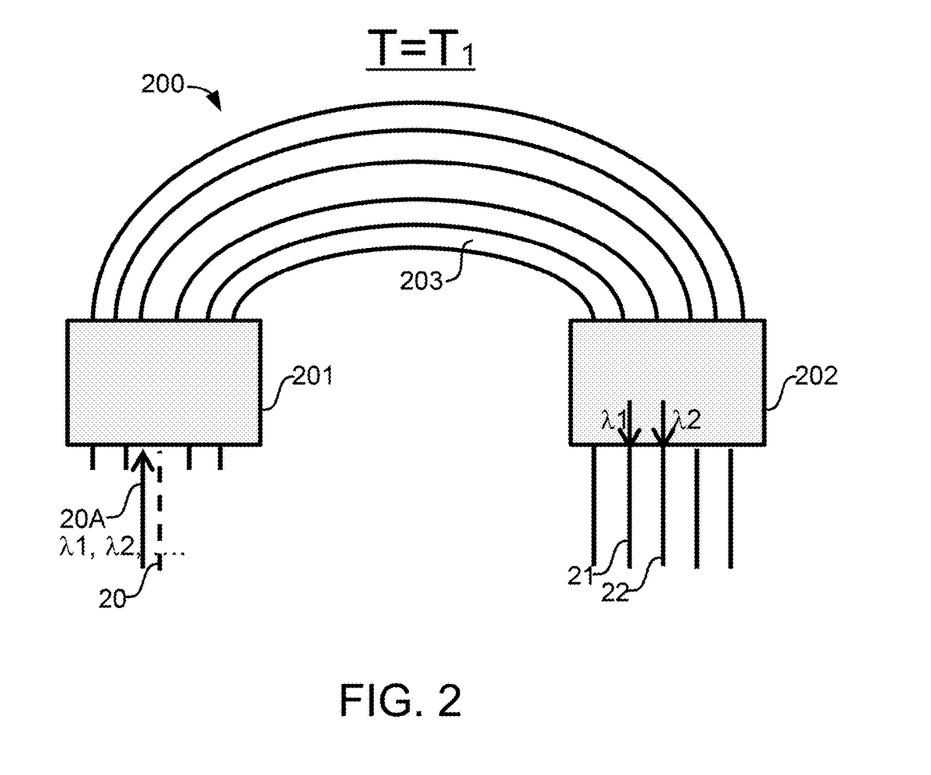
FIG. 2 is a simplified diagram of a multi-channel DEMUX device configured to reset input channel position due to temperature shift from $T_0$ to $T_1$ according to an embodiment of the present invention.

FIG. 2 is a simplified diagram of a multi-channel DEMUX device configured to reset input channel position due to temperature shift from $T_0$ to $T_1$ according to an embodiment of the present invention. This diagram is merely an example, which should not unduly limit the scope of the claims. One of ordinary skill in the art would recognize many variations, alternatives, and modifications. As shown, the multi-channel DEMUX device 200 is substantially the same as the multi-channel DEMUX device 100, except that the device 200 is configured to shift the input channel position when environmental temperature changes. For example, as $T_0$ is changed $T_1$, if the input channel position is shifted a proper distance from preset position (for $T_0$) 20 to a new position 20A (when $T=T_1$) so that any spatial changes of focus positions of output channels (202) due to an array phase shift to each channel caused by such temperature change, the de-multiplexed output lights with specific wavelengths (such as λ1 for channel 21 and λ2 for channel 22, or any other channels) can be again aligned to respective positions corresponding to output waveguide channels which have been predetermined for $T=T_0$. Therefore, simply moving one location of the input light with multiplexed wavelengths is able to compensate multiple walk-off focus positions of output lights with de-multiplexed wavelengths at respective output waveguide channels. In other words, at each output channel that is configured to connect a waveguide will carry a light with a locked wavelength regardless of environmental temperature changes (within the allowed standard system operation specification).

Figure 3A:
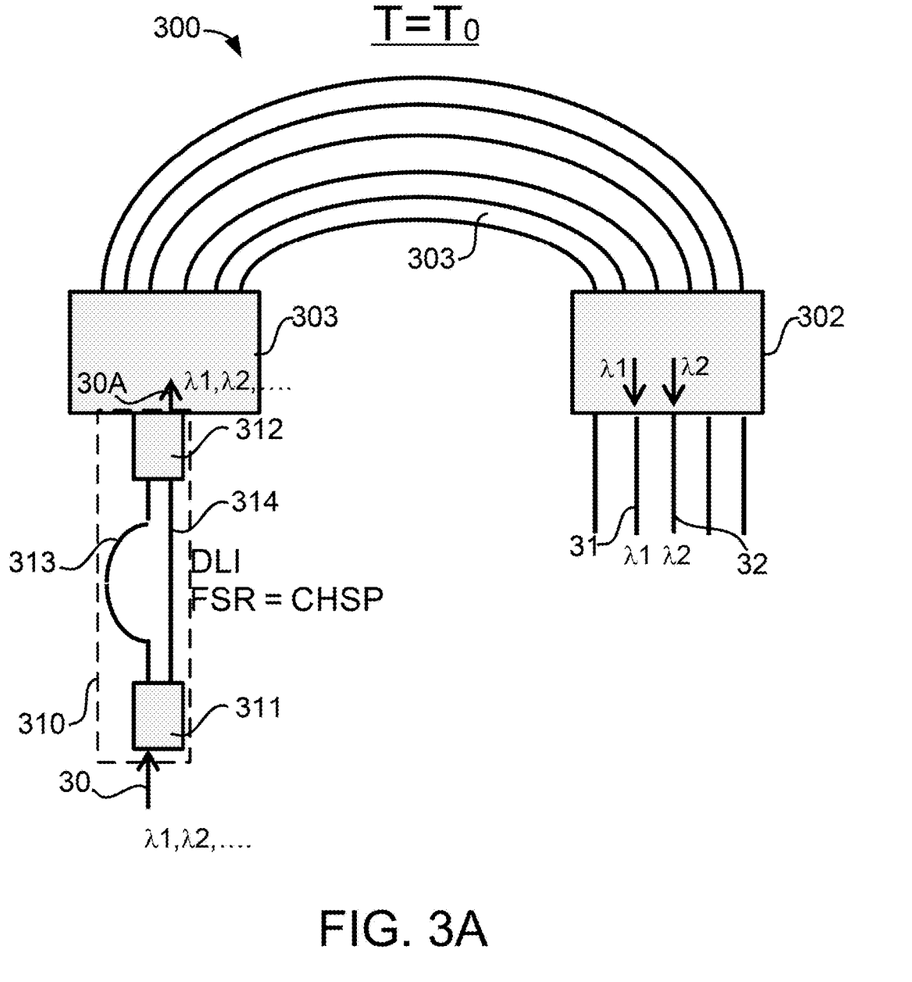
FIG. 3A is a simplified diagram of a temperature insensitive multi-channel DEMUX device at an environmental temperature $T_0$ according to an embodiment of the present invention.

In an embodiment, a temperature-controlled, delayed length interferometer (DLI) can be used for implementing the above idea for compensating the temperature-dependent channel focus position walk-off by intentionally shifting an input channel position. FIG. 3A is a simplified diagram of a temperature insensitive multi-channel DEMUX device at an environmental temperature $T_0$ according to an embodiment of the present invention. This diagram is merely an example, which should not unduly limit the scope of the claims. One of ordinary skill in the art would recognize many variations, alternatives, and modifications. As shown, the multi-channel DEMUX device 300 includes a waveguide-based DLI 310 configured to couple the incoming light 30 and tune its focus position of the input channel 30A of the DEMUX device 300.

Referring to FIG. 3A, DLI 310 includes a first optical power coupler 311 configured to receive the input light at position 30 with multiplexed wavelengths and split (by a input coupler 311) into two branches of waveguides 313 and 314 before being combined again at a second optical power coupler 312 to have an output light (still having the multiplexed wavelengths) aligned to the input light focus position 30A of the DEMUX device 300. A first branch waveguide 313 is designated to have a longer length than a second branch waveguide 314 by a specific value, giving a phase delay. As the input light, split by the input coupler, transmits through the two branches of waveguides with the phase delay and merges at the output coupler, a diffraction spectrum is formed with multiple harmonic peaks being focused at specific positions. In a specific embodiment, a specific DLI setting with the phase delay is chosen to provide a spacing between two successive harmonic peaks, termed free-spectral-range (FSR), to be equal to difference of two nearest neighbor channel wavelengths. For example, if wavelength λ1 and wavelength λ2 are two wavelengths corresponding to two neighbor channels such as 50 GHz or 100 GHz for a DWDM communication system, then the FSR of the DLI 310 is chosen to be, of course after converting from a frequency unit to a length unit, equal to |λ1−λ2|. This DLI setting ensures that all lights with different wavelengths after passing through the two branches of waveguides 313 and 314 to enter the second optical power coupler 312 can be focused to a single point, i.e., with a single focus point.

In another specific embodiment, the two branches of waveguides are all made by silicon-based material on a single silicon-on-insulator substrate. One branch can also be attached with a resistive heater that is able to change device temperature for providing a tuning ability of the index of this branch of waveguide. Therefore, the phase delay between the two branches of waveguide becomes a tunable element that can be used for making temperature-insensitive device in optical communication system.

In addition, the reason for choosing this value for FSR is to allow the focus position of each channel light been adjustable within the spacing to two successive harmonic peaks, thus all channels associated with the DEMUX device can be adjusted in a same fashion. Because the refractive index of grating waveguides (303) are temperature sensitive, the transmission phase shift from one channel to another is changing due to a change of environmental temperature, resulting in corresponding walk-off of the focus position of each channel away from the designated output waveguide position or loss of significant of optical power of the output signal with de-multiplexed wavelength. Referring to FIG. 2, this output channel walk-off can be compensated by adjusting input light position 20A before the first input free space coupler 201. As the change of channel focus position due to temperature-induced index change is substantially linear, a reversed shift of input light focus position 20A in front of the input coupler 201 is able to move the focus positions of all channels to an opposite direction against temperature-induced walk-off in front the output coupler 202 to possibly align with originally designated respective output waveguide positions (such as 21 or 22 for channel λ1 or λ2).

In a specific embodiment, the adjustment of input light focus position 30A for compensating temperature induced walk-off can be achieved using the waveguide-based DLI 310. If $T=T_0$ is a standard designated temperature, referring to FIG. 3A, the input light focus position 30A for the DEMUX device 300 does not shift away from a designated position for the incoming light position 30. Therefore, DLI 310 simply turns off its heater associated with at least one branch (313) to retain the input light focus position 30A at its originally designated position for incoming light of DEMUX device 300. If environmental temperature changes, the DLI 310 is configured to tune the heater to move input light focus position 30A in order to compensate any temperature-induced walk-off. Since the DLI 310 only needs set a heater to just one branch of waveguide (313) to tune corresponding phase delay, the heater consumes much less power compared to TEC heater used in conventional AWG DEMUX device (100).

Figure 3B:
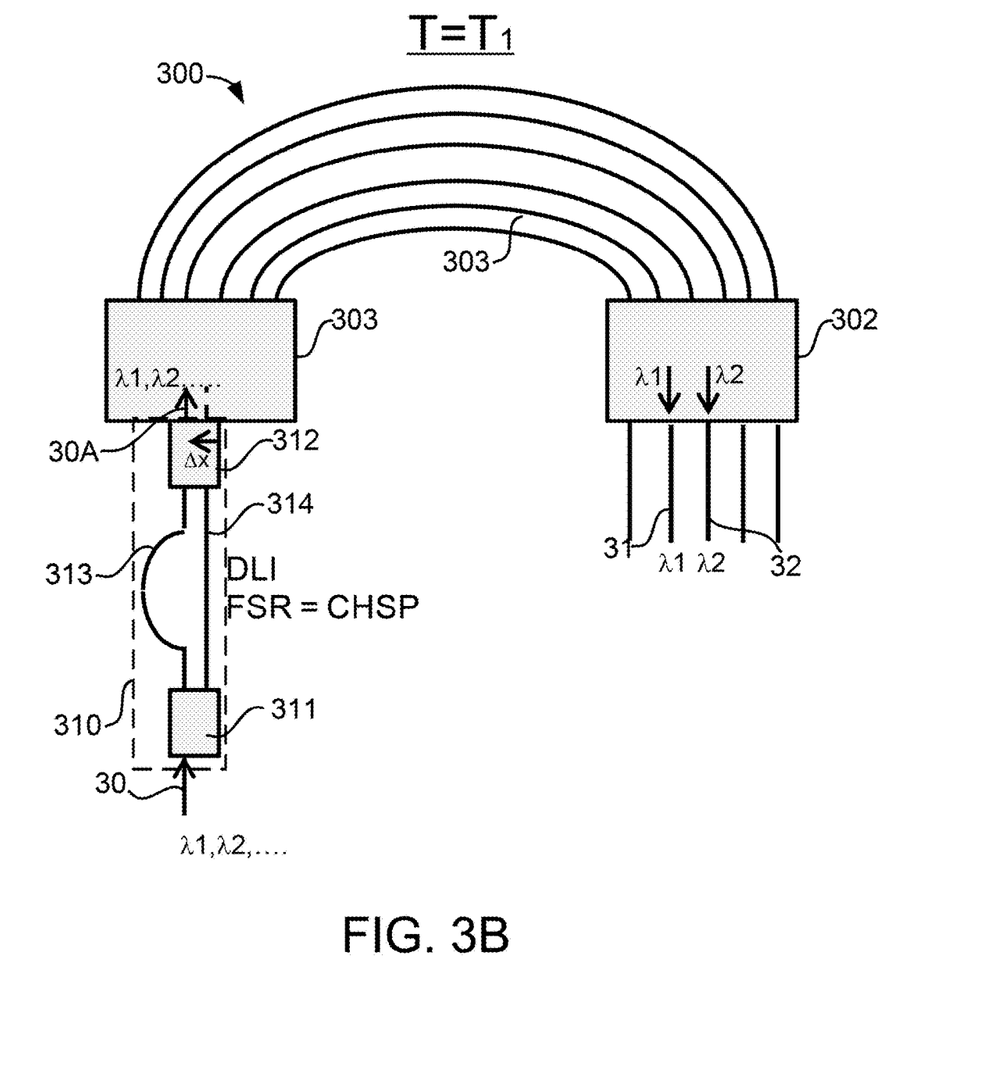
FIG. 3B is a simplified diagram of the temperature insensitive multi-channel DEMUX device at an environmental temperature $T_1 \neq T_0$ according to an embodiment of the present invention.

FIG. 3B is a simplified diagram of the temperature insensitive multi-channel DEMUX device at an environmental temperature $T_1 \neq T_0$ according to an embodiment of the present invention. As shown, the multi-channel DEMUX device 300 includes DLI 310 with a heater turned on to intentionally cause the input light focus position 30A to shift by a distance Δx away from the position for incoming light 30 at $T=T_1$ (as if without the DLI 310 being implemented with the DEMUX device 300). Since the DLI 310 has its free-spectral-range FSR equal to the spacing between two consecutive wavelengths, e.g., λ1 and λ2, the shifted distance Δx of the input light focus position 30A is diffractively transmitted through the free space coupler 301 and the grating waveguides 303 and merged again after another free space coupler 302 with an interference spectrum with multiple focus positions of output lights with demultiplexed wavelengths being re-aligned with originally designated channel positions for output waveguides. For example, light of wavelength λ1 is re-aligned with channel 31 and light of wavelength λ2 is re-aligned with channel 32 at their original designated position for standard $T=T_0$. Note, the heater associated with the branch of waveguide with longer length can be a resistive heater which consumes much less power than conventional TEC heater used for arrayed waveguide grating device. Additionally, phase delay of the DLI mainly is achieved by properly selecting length of the longer branch of waveguide, depending on the channel spacing of the DWDM or CWDM optical communication systems, while heater tuning within DLI provides just flexible tunability of using the phase delay to control the intensity peak position of the input light to ensure compensation of the output channel walking-off of the DEMUX device when environmental temperature changes.

Figure 4A:
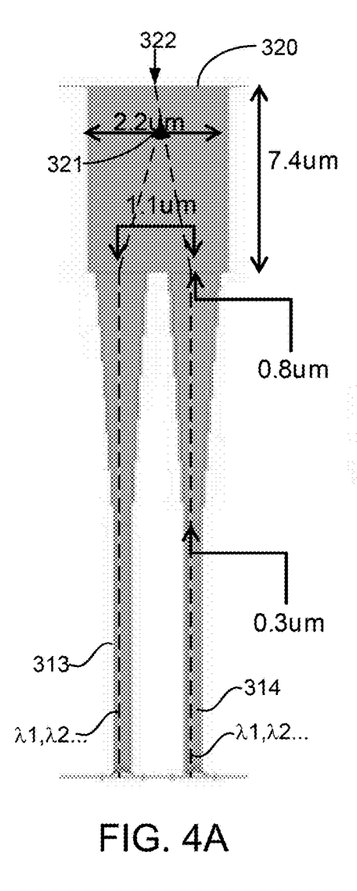
FIG. 4A is a top view of an optical combiner in Delay-line Interferometer (DLI) for temperature-insensitive DEMUX device according to an embodiment of the present invention.

FIG. 4A is a top view of an optical combiner in Delay-line Interferometer for temperature-insensitive DEMUX device according to an embodiment of the present invention. This diagram is merely an example, which should not unduly limit the scope of the claims. One of ordinary skill in the art would recognize many variations, alternatives, and modifications. In an embodiment, the second (or the first) optical power coupler 312 (or 311) is a Multimode Interference (MMI) coupler. As shown, the MMI coupler is a 2×1 combiner, with two input ports and one output port as shown, directly coupled with the first free space coupler 301 of the DEMUX device 300. The cross-sectional view shows a physical structure of a 2×1 MMI coupler for combining two branches of waveguides 313 and 314 to an output light with its exit plane 320 in contact with the free space coupler 301 (not shown in FIG. 4A). In a specific embodiment, it also can be a 2×2 coupler with one of two output ports being terminated. Each input port receives the same light with multiplexed wavelengths but with different phases.

In another specific embodiment, the MMI coupler has a width dimension about twice larger than a spacing between two input ports and a length dimension set to be longer than a focus length for lights out of the two input ports. For example, the width of the MMI coupler is about 2.2 µm and the length is about 7.4 µm, while a focus length of lights from the two input ports is about 5.3 µm, with a center separation the two input ports being about 1.1 µm. Each branch of waveguide carries the light with multiplexed wavelengths of $\lambda 1, \lambda 2, \ldots$, split earlier by a splitter (311 and not shown in FIG. 4A) through a channel with lateral dimension of about 0.8 µm, then the two branches of light with different phase form a interference spectrum with a signal focus point due to the setting of FSR being equal to channel spacing. The focus point 321 is the highest intensity point of the lights with all the wavelengths, which is located below the exit plane 320 by about 2.1 µm. Because the MMI coupler is made longer than focus length, it introduces an extra phase for light traveling from the focus point toward the exit plane where an intensity peak position 322 is shifted away from a projected center position of the focus point 321. This intensity peak position 322 within the exit plane 320 is an actual location of the input light received by the first free space coupler 301 of the DEMUX device 300. Depending on the phase delay of the DLI, the intensity peak position 322 is shifting a different distance within the exit plane. By selecting proper delayed length of one branch of waveguide as well as by tuning the heater associated with the branch with delayed length, the phase delay is easily tunable. Therefore, the DLI is able to tune input light location for the DEMUX device 300 when environmental temperature changes.

Figure 4B:
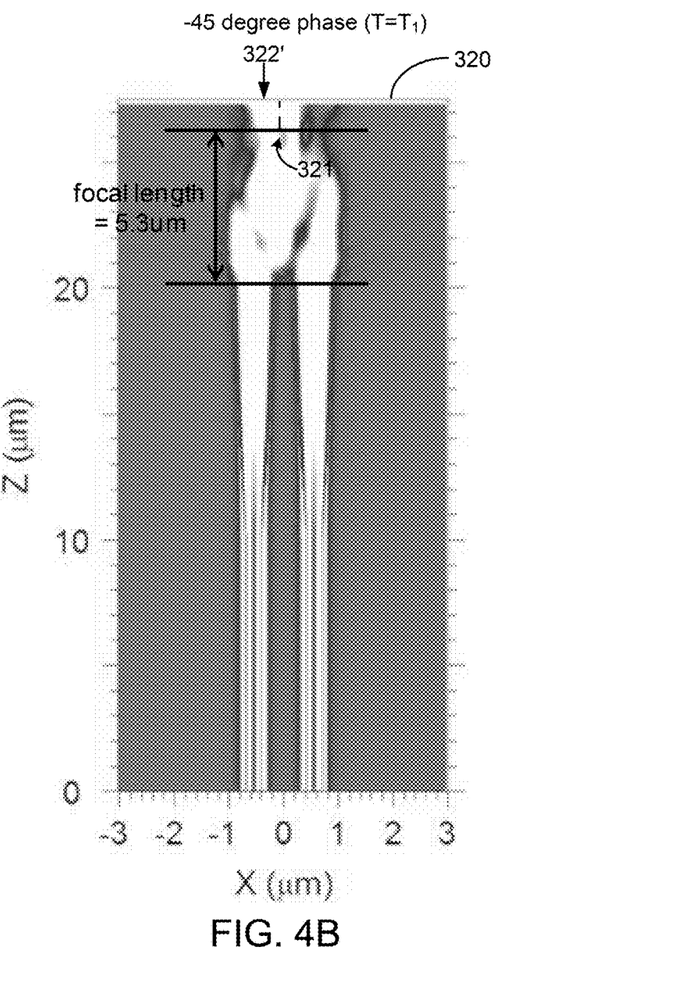
FIG. 4B is a top view of power distribution of lights transmitting through the optical combiner of FIG. 4A with shifted focus position as an input light of a DEMUX device at $T=T_1$ according an embodiment of the present invention.

FIG. 4B is a top view of power distribution of lights transmitting through the optical combiner of FIG. 4A with shifted focus position as an input light of a DEMUX device at $T=T_1$ according an embodiment of the present invention. This diagram is merely an example, which should not unduly limit the scope of the claims. One of ordinary skill in the art would recognize many variations, alternatives, and modifications. This is a specific example showing intensity peak position moves when the phase of silicon-waveguide-based DLI is changed. As shown, when $T=T_1$, corresponding phase shift relative to that for $T=T_0$ is about −45 degree. Due to interference effect, the combined light, carrying all wavelengths of $\lambda 1, \lambda 2, \ldots$, out of the two input ports 313 and 314 with center separation of about 1.1 µm are focused at the same point 321, but the intensity peak position 322' at the exit plane 320 of the MMI coupler is shifted toward left direction by about −0.25 µm relative to a direct projected position of the focus point 321 at the exit plane 320.

Figure 5:
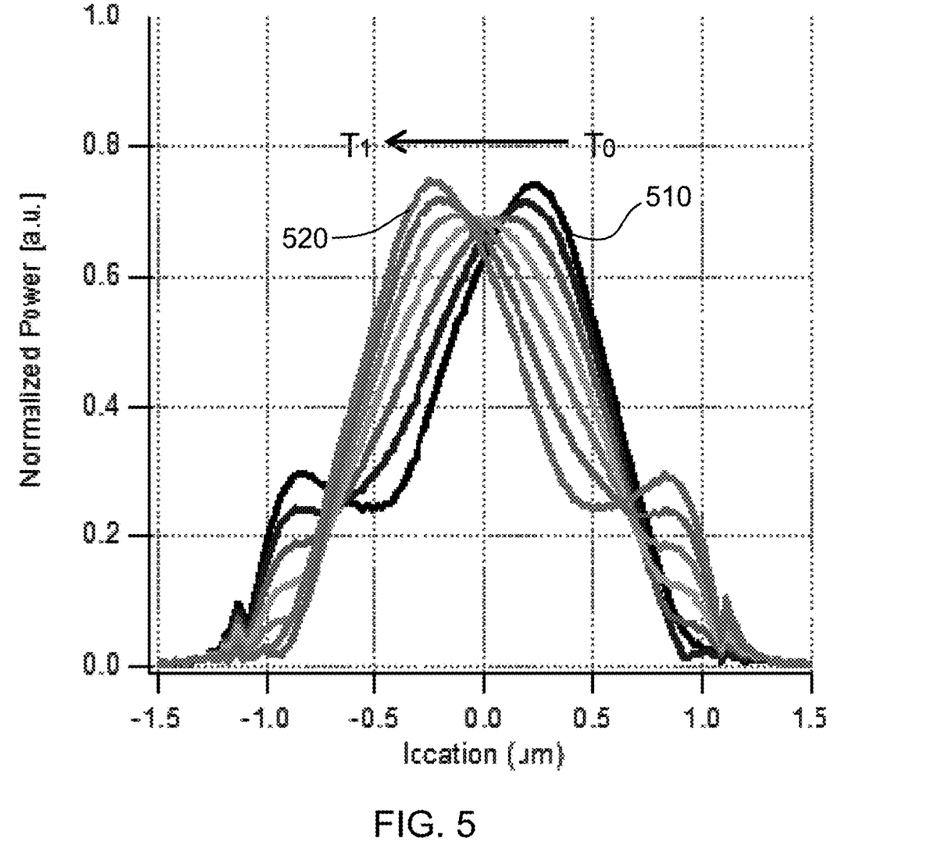
FIG. 5 is a plot of normalized power of output light of DLI showing light focus position shift due to temperature change from $T_0$ to $T_1$ according to an embodiment of the present invention.

FIG. 5 is a plot of normalized power of the DLI output light of with focus position shifted due to temperature change from $T_0$ to $T_1$ according to an embodiment of the present invention. This diagram is merely an example, which should not unduly limit the scope of the claims. One of ordinary skill in the art would recognize many variations, alternatives, and modifications. The normalized power intensity profile is a 2D plot of the combined light signal at the exit plane of the MMI coupler which is made to be longer than the focus length of two input light branches. As shown, the normalized power plot of DLI output light signal shifts its position from one intensity profile 510 to another intensity profile 520 following the change of temperature change from $T_0$ to $T_1$. The intensity peak position of profile 520 represents its position 322 at the exit plane 320 of the MMI coupler shown in FIG. 4A. The intensity peak position of profile 521 represents its position 322' at the exit plane 320 of the MMI coupler shown in FIG. 4B. Therefore, the DLI with the MMI output coupler is able to tune the location of light intensity peak at the exit plane 320. When the exit plane 320 is attached with the free space coupler of a DEMUX device (e.g., 300 of FIG. 3B), the position of DEMUX input light is changed accordingly. If the above shift of DEMUX input light position is properly tuned, it can compensate the temperature-dependent drift of DEMUX output channel positions. The heater associated with one (or two) optical branch of the DLI is able to provide controllable adjustment to the DLI output light shift based on actual environmental temperature. The resulted input light position of DEMUX device can then be controlled to just properly compensate the output channel position drift due to temperature-induced waveguide grating spectrum shift. Therefore, the DEMUX device 300 becomes a temperature-insensitive multi-channel DEMUX device.

In one or more implementations of the application, a temperature-insensitive MUX device is substantially the same as the DEMUX device described above by just reversing the optical path. The temperature-dependent drift of multiple input channels of the MUX device can still be used for transmitting lights with various channel wavelengths. But they can all be corrected at output port by a heater-controlled DLI with a tunable phase for realigning the output multiplexed light.

In an alternative implementation, the temperature-insensitive DEMUX/MUX device remains temperature insensitive within a certain environmental temperature range allowed by international standard for field-deployed DWDM system. For example, a standard working temperature range is 10 degrees for the DEMUX/MUX device in DWDM system and can be greater than 100 degrees for CWDM system with 20 nm channel spacing.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A temperature-insensitive DEMUX/MUX device for WDM applications comprising: a delay-line interferometer including a first MMI coupler configured to receive a first input light bearing multiple wavelengths and split into two branches of light to respectively transmit through two waveguides with a phase delay, a second MMI coupler configured to combine the two branches of light to form a first output light with an intensity peak position in an exit plane of the second MMI coupler, the exit plane being perpendicular to the first output light at a first distance away from a focus point of the two branches of light; a heater locally attached with one of the two waveguides of the delay-line interferometer; a first free-space coupler with an input plane attached with the exit plane of the second MMI coupler to receive the first output light as a second input light bearing the same multiple wavelengths; one or more optical fibers or waveguides for grating the second input light spatially based on the multiple wavelengths; and a second free space coupler configured to refocus the spatially grated light to form multiple second output lights respectively at multiple output channels each carrying an individual wavelength of the multiple wavelengths; wherein the intensity peak position of the second input light at the exit plane is shifted a second distance within the exit plane away from a perpendicularly projected position of the focus point of the two branches of light, the second distance is tunable by the heater to make each of the second output lights with corresponding individual wavelength being substantially wherein the heater is a resistive heater configured to change temperature of the one of the two waveguides for tuning the phase delay so to change the second distance within the exit plane for adjusting the intensity peak position of the first output light and subsequently to align the multiple second output lights at multiple output channels respectively.

2. The temperature-insensitive DEMUX/MUX device of claim 1 wherein the multiple wavelengths represent multiple channels in DWDM system having a frequency spacing between two neighboring channels selected from 100 GHz, 50 GHz, 25 GHz, and 12.5 GHz or multiple channels in CWDM system having a frequency spacing of 3500 GHz and other values.

3. The temperature-insensitive DEMUX/MUX device of claim 1 wherein one of the two waveguides comprises an optical path having a length longer than the other to provide the phase delay for forming an interference spectrum of the output light.

4. The temperature-insensitive DEMUX/MUX device of claim 3 wherein the interference spectrum of the combined light is characterized by a free-spectral range between two harmonic intensity peaks, the free-spectral range being determined by the phase delay and substantially being set to be equal to a difference between the first wavelength and the second wavelength.

5. The temperature-insensitive DEMUX/MUX device of claim 1 wherein the two waveguides are respectively coupled to two input ports of the second MMI coupler, the two input ports being separated for giving a focus length measured from the input port towards the exit plane along a body length of the second MMI coupler that is longer than the focus length.

6. The temperature-insensitive DEMUX/MUX device of claim 5 wherein the second MMI coupler comprises a body length of about 7.4 micrometers, two input ports separated by about 1.1 micrometers, and a focus length of about 5.3 micrometers.

7. The temperature-insensitive DEMUX/MUX of claim 1 wherein the first MMI coupler is a 1×2 power coupler and the second MMI coupler is a 2×1 power combiner.

8. The temperature-insensitive DEMUX/MUX device of claim 1 comprising a DEMUX device as light bearing multiple wavelengths transmits from the first MMI coupler to the multiple output channels.

9. The temperature-insensitive DEMUX/MUX device of claim 1 comprising a MUX device as multiple channels of lights each bearing an individual wavelength transmits from the multiple output channels towards the first MMI coupler.

10. The temperature-insensitive DEMUX/MUX device of claim 1 wherein the environmental temperature comprises a standard range of 10 degrees required for a field-deployed DWDM system and a range greater than 100 degrees as required for a field-deployed CWDM system.

11. A method of compensating temperature-induced spatial shift of DEMUX channels, the method comprising: coupling a delay-line interferometer between a first input light bearing multiple wavelengths and an input port of a DEMUX device, the delay-line interferometer (DLI) comprising a first MMI coupler configured to receive the first input light bearing multiple wavelengths and split to two branches of light; two waveguides configured to respectively transmit the two branches of light with a phase delay in one of the two waveguides; a heater locally attached with the one of the two waveguides for tuning the phase delay; a second MMI coupler configured to combine the two branches of light to form a first output light bearing the same multiple wavelengths having an intensity peak position within an exit plane perpendicular to the first output light at a first distance away from a focus point of the two branches of light: transmitting the first output light as a second input light through the exit plane into the DEMUX device; transmitting the second input light through a grating fiber or waveguide to form a multiple second output lights each bearing an individual wavelength of the multiple wavelengths; and re-focusing each second output light to a corresponding output channel; wherein any spatial drift of each second output light away from the corresponding output channel due to a change of environmental temperature is compensated by tuning the phase delay of the DLI to shift the intensity peak position of the first output light within the exit plane; wherein the heater is a resistive heater configured to change temperature of the one of the two waveguides for tuning the phase delay so to change the second distance within the exit plane for adjusting the intensity peak position of the first output light and subsequently to align the multiple second output lights at multiple output channels respectively.

12. The method of claim 11 wherein the multiple wavelengths comprise a plurality of wavelengths at as DWDM channels in ITU grids or CWDM channels, including at least a first wavelength and a second wavelength respectively for two neighboring channels.

13. The method of claim 12 wherein the two neighboring channels comprises a frequency spacing selected from 100 GHz, 50 GHz, 25 GHz, and 12.5 GHz used for DWDM system or 3500 GHz and other values assigned for CWDM system.

14. The method of claim 12 wherein the first output light comprises an interference spectrum caused by the phase delay, the interference spectrum being characterized by a free-spectrum-range being equal to a difference between the first wavelength and the second wavelength.

15. The method of claim 11 wherein the second MMI coupler comprises a body width about twice larger than two input ports respectively for receiving the two branches of light and a body length longer than a focus length of combining the two branches of light therein to allow the exit plane of the second MMI coupler to be the first distance away from the focus point in a direction perpendicular to the exit plane and further allow the intensity peak position of the first output light to be shifted horizontally within the exit plane by a second distance away from a direct projected position of the focus point on the exit plane.

16. The method of claim 11 wherein the heater is tunable to response environmental temperature change in a range of 10 degrees required for a field-deployed DWDM system and in a range greater than 100 degrees as required for a field-deployed CWDM system.

17. A DWDM system comprising a temperature-insensitive DEMUX/MUX device, the temperature-insensitive DEMUX/MUX device comprising: a delay-line interferometer including a first MMI coupler configured to receive a first input light bearing multiple wavelengths and split into two branches of light to respectively transmit through two waveguides with a phase delay, a second MMI coupler configured to combine the two branches of light to form a first output light with an intensity peak position in an exit plane of the second MMI coupler, the exit plane being perpendicular to the first output light at a first distance away from a focus point of the two branches of light; a heater locally attached with one of the two waveguides of the delay-line interferometer; a first free-space coupler with an input plane attached with the exit plane of the second MMI coupler to receive the first output light as a second input light bearing the same multiple wavelengths; one or more optical fibers or waveguides for grating the second input light spatially based on the multiple wavelengths; and a second free space coupler configured to refocus the spatially grated light to form multiple second output lights respectively at multiple output channels each carrying an individual wavelength of the multiple wavelengths; wherein the intensity peak position of the second input light at the exit plane is shifted a second distance within the exit plane away from a perpendicularly projected position of the focus point of the two branches of light, the second distance is tunable by the heater to make each of the second output lights with corresponding individual wavelength being substantially free from any spatial shift off the corresponding output channel at any environmental temperature within standard range of 10 degrees required for field-deployment; wherein the heater is a resistive heater configured to change temperature of the one of the two waveguides for tuning the phase delay so as to change the second distance within the exit plane for adjusting the intensity peak position of the first output light and subsequently to align the multiple second output lights at multiple output channels respectively.

18. A CWDM system comprising a temperature-insensitive DEMUX/MUX device, the temperature-insensitive DEMUX/MUX device comprising: a delay-line interferometer including a first MMI coupler configured to receive a first input light bearing multiple wavelengths and split into two branches of light to respectively transmit through two waveguides with a phase delay, a second MMI coupler configured to combine the two branches of light to form a first output light with an intensity peak position in an exit plane of the second MMI coupler, the exit plane being perpendicular to the first output light at a first distance away from a focus point of the two branches of light; a heater locally attached with one of the two waveguides of the delay-line interferometer; a first free-space coupler with an input plane attached with the exit plane of the second MMI coupler to receive the first output light as a second input light bearing the same multiple wavelengths, one or more optical fibers or waveguides for grating the second input light spatially based on the multiple wavelengths, and a second free space coupler configured to refocus the spatially grated light to form multiple second output lights respectively at multiple output channels each carrying an individual wavelength of the multiple wavelengths; wherein the intensity peak position of the second input light at the exit plane is shifted a second distance within the exit plane away from a perpendicularly projected position of the focus point of the two branches of light, the second distance is tunable by the heater to make each of the second output lights with corresponding individual wavelength being substantially free from any spatial shift off the corresponding output channel at any environmental temperature a range greater than 100 degrees required for field-deployment; wherein the heater is a resistive heater configured to change temperature of the one of the two waveguides for tuning the phase delay so as to change the second distance within the exit plane for adjusting the intensity peak position of the first output light and subsequently to align the multiple second output lights at multiple output channels respectively.

* * * * *